Figure 1:
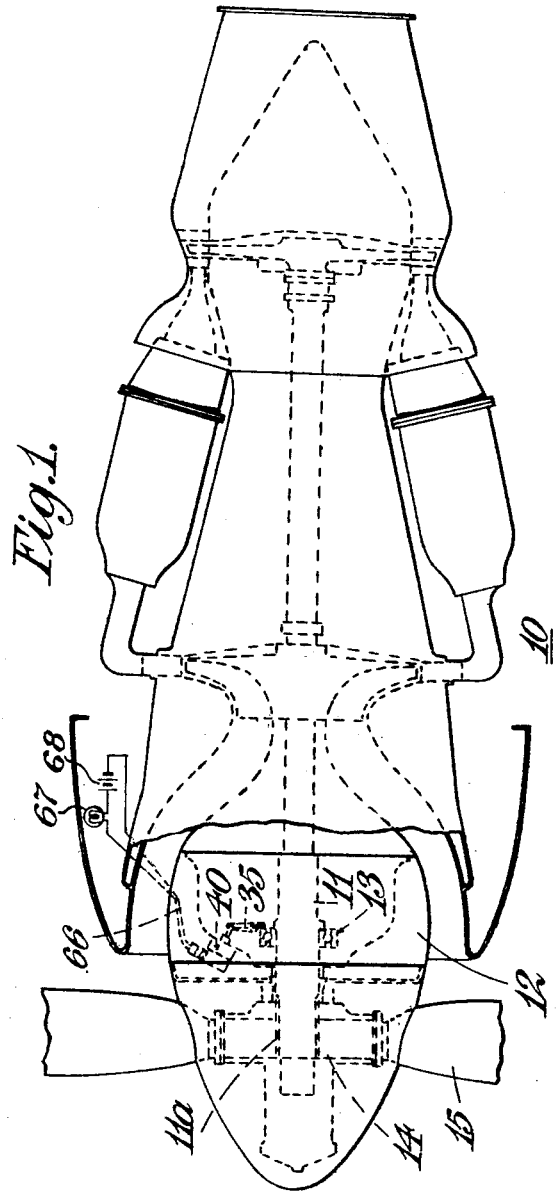

July 10, 1956   P. F. GREEN   2,754,383
PROPELLER-DRIVING ENGINES
Filed Oct. 9, 1952   4 Sheets-Sheet 1

INVENTOR
P. F. GREEN
BY Wilkinson & Mawhinney
ATTYS.

July 10, 1956  P. F. GREEN  2,754,383
PROPELLER-DRIVING ENGINES
Filed Oct. 9, 1952  4 Sheets-Sheet 2

INVENTOR
P. F. GREEN
BY Wilkinson & Mawhinney
ATTYS.

July 10, 1956 P. F. GREEN 2,754,383
PROPELLER-DRIVING ENGINES
Filed Oct. 9, 1952 4 Sheets-Sheet 3

INVENTOR
P. F. GREEN
BY Wilkinson & Mawhinney
ATTYS.

July 10, 1956 P. F. GREEN 2,754,383
PROPELLER-DRIVING ENGINES
Filed Oct. 9, 1952 4 Sheets-Sheet 4
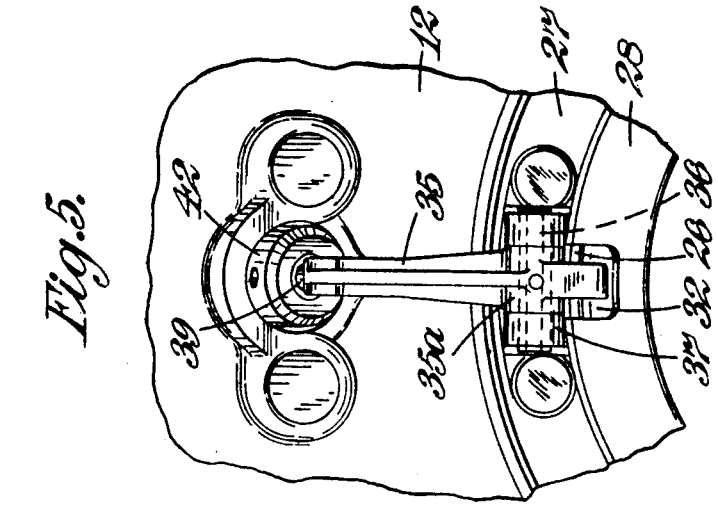
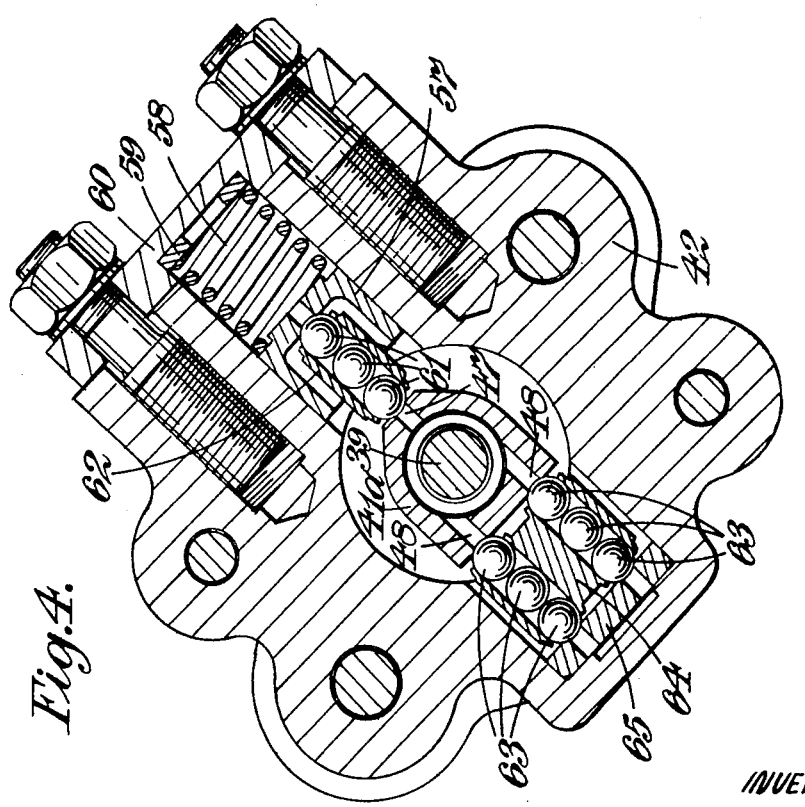
INVENTOR
P. F. GREEN
BY Wilkinson & Mawhinney
ATTYS.

United States Patent Office 2,754,383
Patented July 10, 1956

2,754,383
PROPELLER-DRIVING ENGINES

Percie Francis Green, Allestree, England, assignor to Rolls-Royce Limited, Derby, England, a British company Application October 9, 1952, Serial No. 313,835
Claims priority, application Great Britain October 11, 1951

7 Claims. (Cl. 200—61.39)

This invention relates to propeller-driving engines, for example, engines employed for propelling aircraft, and relates more specifically to reverse-torque-sensitive devices for use in propeller-driving engines.

When the torque in a shaft by which the engine drives the propeller becomes reversed, a signal may be required to be produced which can be used, for example, either to give a visual warning to the pilot or operator, or to initiate an automatic control action. If the torque is reversed owing to failure of an engine, it is often desirable, especially in the case of aircraft having two engines, automatically to feather the associated propeller, thereby to reduce the drag of the 'dead' propeller and to decrease correspondingly the asymmetric thrust acting on the aircraft.

Reverse-torque-sensitive devices have been proposed which comprise a pressure-operated switch sensitive to the fluid pressure in the cylinder of a piston-and-cylinder device forming part of an engine torquemeter, one element of the piston-and-cylinder device having the torque reaction transmitted to it and the other element being connected to stationary structure, and the fluid pressure balancing the torque reaction so that the pressure is a function of the torque.

An object of the present invention is to provide an improved construction of reverse thrust and/or torque-sensitive device which does not depend upon a supply of fluid under pressure for its operation.

According to this invention, a reverse-torque-sensitive device for a propeller-driving engine comprises supporting structure, a shaft or equivalent which is subjected to an axial thrust in one sense during normal operation of the engine, to load said shaft in said sense, mounted in the supporting structure for limited movement in the direction of the axis of rotation of the shaft, and means for sensing reversal of the direction of loading of said shaft including an electrical switch arranged to be operated by said limited axial movement. The shaft or equivalent may be the propeller-shaft of the engine, having the propeller mounted to rotate therewith, or may for example be a reduction gear layshaft, or gear element on a shaft.

Preferably the switch is a toggle-action switch which may be operated through a lever pivoted in the supporting structure.

According to one preferred arrangement of the invention, the shaft is mounted in the supporting structure through a ball thrust bearing connected with the shaft to move axially therewith, and the supporting structure includes a thrust bearing housing accommodating the rotatively stationary outer race of the ball thrust bearing in a manner to permit axial movement of the outer race with the shaft, the rocking lever abutting said outer race to be rocked thereby on axial movement of the shaft.

Figure 2:
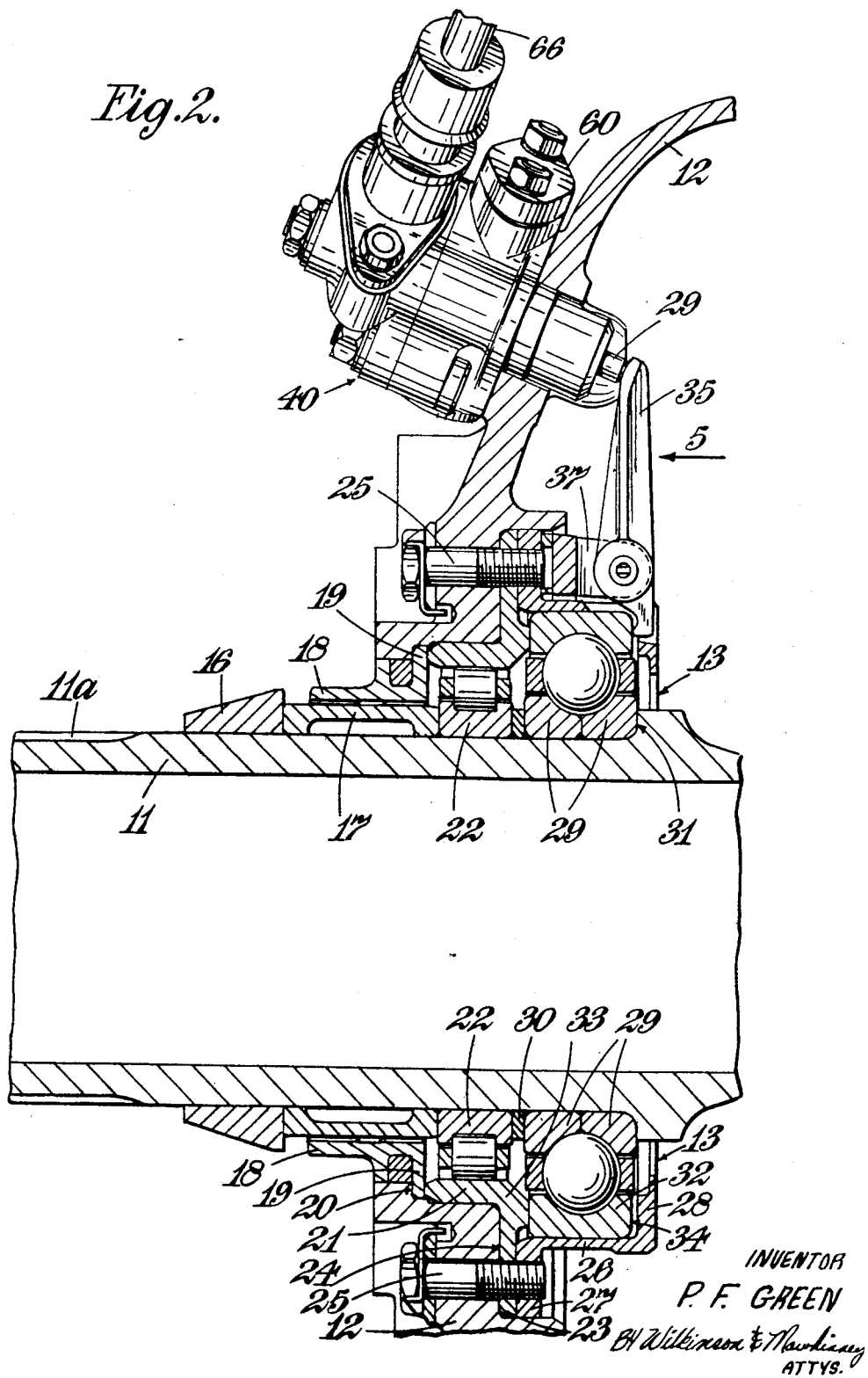
Figure 3:
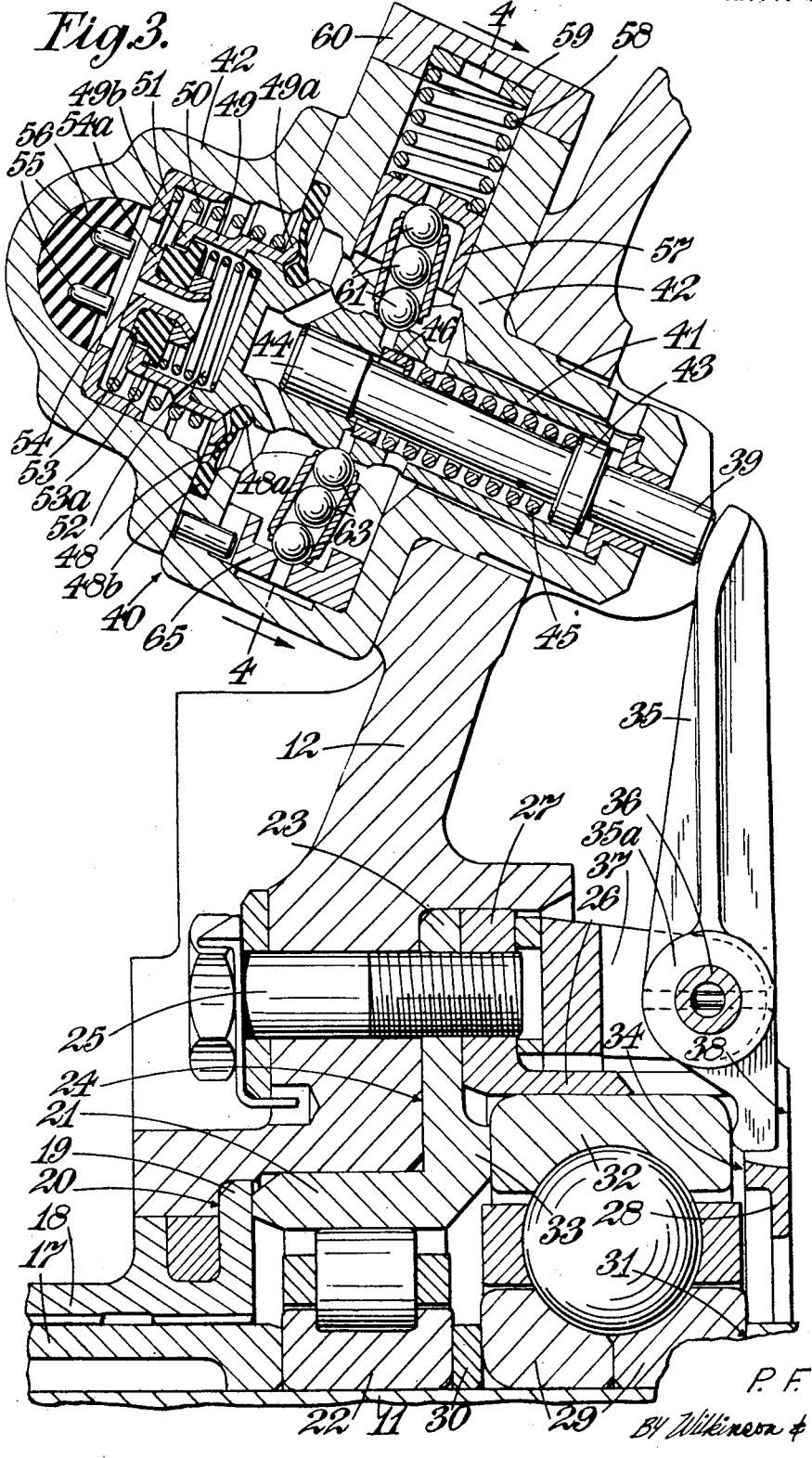

One embodiment of the invention will now be described by way of example, the description making reference to the accompanying drawings, in which: Figure 1 is a diagrammatic illustration of a propeller-driving gas-turbine engine; Figure 2 is a view in section of part of the arrangement of Figure 1; Figure 3 is a view corresponding to Figure 2 but on a larger scale and with further parts in section; Figure 4 is a section on the line 4—4 of Figure 3, and Figure 5 is a view in the direction of the arrow 5 of Figure 2.

In this embodiment, the gas-turbine engine 10 has a forwardly extending propeller shaft 11 which for a part of its length extends through a propeller shaft casing 12 and which intermediate its length is supported in bearings 13 mounted in the propeller shaft casing 12.

The propeller shaft 11 is splined at its forward end 11a to receive the hub 14 of a propeller 15 and carries a thrust collar 16 rearwardly of the splines. The propeller 15 is mounted on the shaft 11 in engagement with the splines 11a and is held between the thrust collar 16 and a nut member (not shown) threaded onto the end of the shaft 11. The thrust collar 16 is located outside the propeller shaft casing 12 and its rear surface is in abutment with an axially-extending sleeve member 17 mounted on the shaft 11, which sleeve member 17 conveniently forms the rotating element of an oil seal provided between the shaft 11 and the propeller shaft casing 12 at the point where the shaft passes through the wall of the casing 12. The stationary element 18 of the oil seal is carried by the propeller shaft casing 12 and has a radial flange 19 which is gripped between a shoulder 20 formed on the propeller shaft casing 12 and a stationary race of one of the bearings 13 which support the shaft 11 in the casing 12 at the point where it passes through the wall of the casing.

The shaft is supported at this point in two coaxial bearings, the forward of which is a journal roller bearing having an inner and rotating race 22 mounted on the shaft 11 with its forward face in abutment with the sleeve 17 forming the rotating element of the oil seal, and an outer and stationary race 21 which is that abutting the radial flange 19 of the stationary oil seal element 18.

The outer race 21 of the journal roller bearing is secured to the propeller shaft casing 12 by means of a radially-outwardly-extending flange 23 which is held in abutment with a radial face 24 on the propeller shaft casing 12 by bolts 25 which also retain in position in the propeller shaft casing a housing for the second of the bearings 13 which is a ball thrust bearing.

The housing for the ball bearing comprises a radial flange 27 through which the bolts 25 above mentioned pass and at the inner diameter of the radial flange an axially-extending body portion 26 terminating at its rear end in a radially-inwardly-extending flange 28.

The ball thrust bearing comprises a two-part inner race 29 which at its forward end is spaced axially from the corresponding race 22 of the roller journal bearing by means of a spacer washer 30 and which at its rearward end abuts against a shoulder 31 machined on the shaft 11 to provide a locating abutment for the inner races 22, 29 of both the bearings, the oil seal sleeve 17, the thrust collar 16 and the propeller hub 14. The outer race 32 of the ball thrust bearing is a sliding fit in the body portion 26 of the ball thrust bearing housing and lies between the radially-inwardly-directed flange 28 of the ball thrust bearing housing and an axially-facing abutment land 33 on the radial flange 23 of the outer race 21 of the journal roller bearing. As will best be seen from Figure 3, the axial dimension of the outer race 32 of the ball thrust bearing is less than the axial distance between the inwardly-directed flange 28 and the abutment land 33, so that the outer race 32 can move a distance of for instance .050" between the position in which it abuts the land 33 and the position in which it abuts the inwardly-directed radial flange 28. The axial clearance is indicated at 34 in Figures 2 and 3.

A rocking lever 35 which extends radially of the propeller shaft 11, is mounted by means of a cross pin 36 in a bracket 37 mounted on and extending rearwardly from the propeller shaft casing 12. The bracket 37 is forked to receive the boss 35a of the lever 35 between its two arms. The ball-thrust bearing housing is cut away as indicated at 38 adjacent the lever 35 so that one end of the lever 35 can extend therethrough to bear on the outer race 32 of the ball thrust bearing. The other end of the lever 35 is arranged to bear on one end of a plunger 39 which forms part of a toggle switch mechanism 40. The distance between the rocking axis of the lever 35 and the end which bears on the thrust bearing outer race 32 is less than the distance between the axis and the end of the lever which bears on the plunger 39. The plunger 39 (referred to hereinafter as the main plunger) is spring loaded against the end of the lever 35, which is therefore maintained in contact at its other end with the outer race 32 of the thrust bearing.

The main plunger of the toggle switch mechanism 40 slides in a stepped bore of a sleeve 41 which is received in a bore in the switch casing 42 at its end adjacent the lever 35, and the main plunger 39 is formed with two lands 43, 44 which co-operate with the two diameters of the bore of the sleeve 41. A plunger-loading spring 45 is provided between the end face of the step in the bore of the sleeve 42 and the end face of the larger land 43 to load the main plunger, the spring 45 being compressed by movement of the main plunger relative to the sleeve in one direction. A washer 46 of selected axial thickness is provided between the step in the bore and the spring 45 to adjust the initial compression of the spring.

The sleeve 41 is formed with a head 41a at its end remote from the lever 35 and the surface of the head is provided with three bores terminating in part-spherical recesses (Figure 4) one 47 at one end of a diameter and the other two 48 symmetrically spaced with respect to the opposite end of the diameter, all three being in the same transverse plane, and these recesses afford the means by which the toggle mechanism co-operates with the sleeve 41.

The head 41a of the sleeve 41 at its end remote from the lever 35 is formed with a circumferential groove which receives a circumferential bead 48a of a flexible annular rubber sealing member 48, the outer periphery 48b of which is also in the form of a bead and is gripped between two portions of the switch casing 42.

The end face of the head 41a of the sleeve 41 beyond the sealing member 48 abuts a shoulder on a collar 49 which encircles the end of the head 41a, and the collar 49 is formed at the end adjacent the rubber sealing member with an outwardly-directed flange 49a and at the end remote from the sleeve with an inwardly-turned flange 49b. A return spring 50 is provided between the outwardly-directed flange 49a on the collar 49 and an abutment facing on an insert 51 in the switch casing 42.

An electrical switch contact button is held against the inwardly-turned flange 49b of the collar 49 by means of a light spring 52, and this button is in the form of an annular flanged bush 53 of an insulating material, such as that known as Tufnol (registered trademark) pierced by a hollow metal rivet 54 of which the ends are outwardly-turned to form reinforcing flanges for the bush 53. The light spring 52 holds the flange 53a on the bush 53 against the inwardly-turned flange 49b of the collar 49 by being in abutment with the opposite surface of the flange 53a at one end and with the end surface of the head 41a of the sleeve at its other end. The reinforcing flange 54a of the rivet 54 remote from the sleeve 41 forms a bridge to connect a pair of electrical contacts 55 which are mounted in an insulated mounting 56 in the end face of the switch casing, when the button 53, 54 is loaded in that direction by movement of the sleeve 41, but normally the contact button 53, 54 is held by the return spring 50 in a position spaced from the pair of contacts 55.

The toggle action is provided (Figures 3 and 4) by means of a spring-loaded plunger 57 whose axis is normal to and intersects the axis of the main plunger 39 and the sleeve 41. This spring-loaded plunger works in a bore in the switch casing 42, being loaded in a direction towards the main plunger 39 and sleeve 41 by means of a spring 58 which at its other end abuts a closure plate 60 of the switch casing 41 through a washer 59. The plunger 57 is formed on the side adjacent the main plunger 39 and sleeve 41, with a part-spherical recess, similar to the part-spherical recesses in the head 41a of the sleeve 41. Co-operating with the recess on the plunger 57 and the single recess on the sleeve 41a are two balls 61, spaced apart by a similar ball, the centres of the balls being co-linear. The balls are held in this relation by a tubular cage 62, the length of which is somewhat greater than twice the diameter of one ball 61. The diameter of the balls 61 is the same as that of the part-spherical recesses, and the internal diameter of the tubular cage 62 is fractionally greater than the diameter of the balls 61. The ends of the tubular cage 62 are peened over to retain the balls 61 in position.

Co-operating with the symmetrical pair of recesses formed in the head 41a there is a pair of balls, which are the end balls of two parallel rows each of three balls 63 carried in a cage 64 of approximately figure 8 cross-section, the balls at the other end of the two rows of three balls being received in corresponding part-spherical recesses formed in a hardened metal plate 65 in a second bore in the casing 42 coaxial with the bore receiving the plunger 57. The cage 64 containing the two rows of balls serves to locate the sleeve 41 at its end remote from the lever 35.

In an alternative arrangement three cages, each containing one row of three balls, may be used, the cages being spaced around the circumference at say 120°, two having a stationary abutment plate and the third co-operating with a spring-loaded plunger 57 in the switch casing.

In operation the propeller shaft 11 is normally subjected to a positive forward thrust due to the propeller, and thus the outer race 32 of the ball thrust bearing is maintained in contact with the abutment land 33 on the outer race 21 of the journal roller bearing. Under these conditions, the main plunger 39 of the toggle switch mechanism 40 is held in the extended position by the plunger-loading spring 45, the lever 35 thus being maintained in contact with the outer race 32 of the thrust bearing.

Should the thrust on the propeller shaft 11 be reversed owing to the reversal of the torque in the shaft, for example, due to engine failure causing the propeller 15 to windmill, the propeller shaft 11 and the thrust bearing will move a distance of .050" in a rearward direction until the outer race 32 of the ball thrust bearing abuts the inwardly-extending flange 28 of the ball thrust bearing housing. This movement rocks the lever 35, causing the main plunger 39 of the toggle switch mechanism 40 to be depressed, the movement of the bearing race being multiplied by the magnification ratio of the lever 35. Movement of the main plunger 39 relative to the sleeve 41 compresses the plunger-loading spring 45, thus loading the sleeve 42 to move in the same direction. When this load is sufficient to overcome the resistance of the toggle mechanism 57—65, by moving the spring-loaded toggle plunger 57 against its spring 58, the sleeve 41 moves under the influence of this loading, compressing the return spring 50 and allowing the flange 54a of the contact button 53, 54 to bridge the pair of contacts 55. The contact button is maintained against the contacts by means of the light spring 52, and this arrangement ensures good contact between the flange 54a of the contact button and the pair of contacts 55 in spite of small tolerances in manufacture.

By making the bush 53 of the contact button from an insulating material, earthing the metal rivet 54 to the casing 42 is prevented.

Should the propeller shaft torque, and thus the thrust accommodated by the ball thrust bearing attain once more a positive value, the shaft 11 and the outer race 32 of the thrust bearing move forward .050", and the return spring 50 acting on the collar 49 which is carried by the sleeve 41 forces the latter to move axially, displacing the spring-loaded toggle plunger and returning the toggle mechanism to its original position. The main plunger 39 of the toggle switch mechanism 40 is also forced out by the plunger-loading spring 45 acting on it, maintaining the lever 35 in contact with the outer race 32 of the ball thrust bearing. The movement of the collar 49 and sleeve 41 also carries the contact button 53, 54 away from the contact points 55, thus breaking the contact. The toggle action ensures that no intermittent contact occurs, and that the contact button moves in a positive manner from a position in which there is a firm contact between the rivet 54 and the contacts 55 to the position in which they are spaced apart.

The making of the contacts may be arranged through a cable 66 to complete an electrical circuit comprising, for example, a power supply source and a lamp or other warning device, to give a visual warning to the pilot or operator.

Alternatively it will be appreciated that a reverse-thrust-operated switch may be used to control the action of another mechanism; for instance, the making of the contact when the thrust on the propeller shaft is reversed, may complete a circuit initiating the feathering of the propeller.

Whilst in the above embodiment the invention has been described as applied to a reverse-thrust-sensitive device associated with the propeller shaft, it may alternatively be associated with a shaft in a reduction gear between the engine and propeller, which reduction gear is of the type including one or more gear elements which are subjected to axial loading which is dependent on the torque transmitted through the gear. Thus with gears of the helical type an axial thrust is developed, and a shaft, e. g. a layshaft, having such gears may be mounted for limited axial movement, the electrical switching device being arranged to sense the reversal of such movement arising from reversal of loading on the shaft.

I claim:

1. A reverse-thrust sensitive device comprising a shaft adapted to be loaded by an axial thrust; stationary structure; a thrust bearing supporting said shaft for rotation in said stationary structure and comprising a rotating race, a non-rotating race, and ball elements cooperating with the races to transmit thrust therebetween; a thrust bearing housing in said stationary structure, said non-rotating race of said thrust bearing being slidingly accommodated in said thrust bearing housing, said thrust bearing housing having axially spaced abutments limiting sliding of the non-rotating race in said housing; an electrical switch mechanism; and switch-operating means adapted to be actuated by said thrust bearing on axial sliding of said non-rotating race in said housing and on actuation to operate said electrical switch mechanism, said switch-operating means comprising a lever pivoted on the stationary structure and having one of its ends in contact with said non-rotating race to be rocked by sliding of the non-rotating race in said housing and having the other of its ends cooperating with the switch mechanism to operate it.

2. A reverse-thrust sensitive device comprising a shaft adapted to be loaded by an axial thrust; stationary structure; a thrust bearing adapted to support said shaft for rotation in said stationary structure and mounted in said stationary structure for limited axial movement, thereby to be moved axially on reversal of the direction of action of said thrust on said shaft, said thrust bearing comprising a rotating race, a non-rotating race and ball elements co-operating with the races to transmit thrust therebetween; a thrust bearing housing in said stationary structure slidingly accommodating the non-rotating race and having axially spaced abutments to limit sliding of the non-rotating race; an electrical, toggle-action switch mechanism; switch-operating means comprising a lever pivoted on the stationary structure and having one of its ends in contact with said non-rotating race to be rocked by axial movement of the non-rotating race and the other of its ends adapted to operate the switch mechanism; said switch mechanism comprising a casing, a sleeve slidable in said casing in a direction axially of itself, a plunger slidable axially of the sleeve, a spring arranged between said plunger and said sleeve to load said sleeve to move in one direction on displacement of the plunger in said direction, the plunger having a part engaged by said other end of the rocking lever so as to be moved in said one direction on rocking of the lever due to axial displacement of the non-rotating race, a return spring loading said sleeve to move in a direction opposite to said one direction, electrical contact means arranged to be closed on movement of said sleeve by displacement in said one direction, and toggle means co-operating with the sleeve resiliently to restrain displacement of the sleeve in both directions.

3. A reverse-thrust sensitive device as claimed in claim 2, wherein the electrical contact means comprises a pair of fixed contacts and a contact-bridging member formed as part of a button carried by and resiliently connected to said sleeve.

4. A reverse-thrust sensitive device as claimed in claim 3, wherein the contact-bridging member comprises a bush of insulating material and a flanged metal rivet extending therethrough, one flange of said rivet being arranged to bridge said fixed contacts in one position of the sleeve, and wherein there is provided a light spring between said sleeve and said bush to load said bush in a direction towards said fixed contacts, and abutment means carried by the sleeve to limit displacement of the bush by said light spring.

5. A reverse-thrust sensitive device as claimed in claim 4, wherein the toggle means comprises a toggle plunger slidable in said casing at right angles to the axis of the sleeve, a toggle spring to load said toggle plunger towards the sleeve and a set of aligned balls accommodated in a cage with one end ball bearing against the toggle plunger and the other end ball bearing against the sleeve, whereby loads due to the toggle spring are transmitted to the sleeve to tend to hold the sleeve at one end or the other of its axial travel.

6. A reverse-thrust sensitive device as claimed in claim 5, wherein the toggle means also comprises means to maintain the sleeve in position comprising further sets of aligned balls, each set having one end ball bearing on the sleeve on the opposite side thereof from the plunger and having its opposite end ball bearing against the casing.

7. The combination with a propeller and a propeller-driving engine including supporting structure, a driving interconnection between said engine and said propeller including a shaft through which torque is transmitted from the engine to the propeller and which is subjected by the propeller to an axial thrust in one sense during normal operation of the engine and which is subjected by the propeller to an axial thrust in the reverse sense during abnormal operation of the engine, of bearing means adapted to support said shaft in the supporting structure with a limited freedom for movement in the direction of the axis of rotation of the shaft, whereby on reversal of said axial thrust such limited movement of the shaft takes place relative to said supporting structure, means for sensing said movement including an electrical switch to be operated by said movement, and means responsive to operation of said switch.

References Cited in the file of this patent

UNITED STATES PATENTS

| | | |
|---|---|---|
| 2,055,637 | Stanley et al. | Sept. 29, 1936 |
| 2,605,849 | Bordelon | Aug. 5, 1952 |
| 2,683,848 | Schmitter | July 13, 1954 |

FOREIGN PATENTS

| | | |
|---|---|---|
| 123,655 | Great Britain | Nov. 11, 1918 |